March 28, 1950  W. A. LANDRETH  2,501,684
CENTERING ATTACHMENT FOR THE TAIL STOCK OF LATHES
Filed May 3, 1946
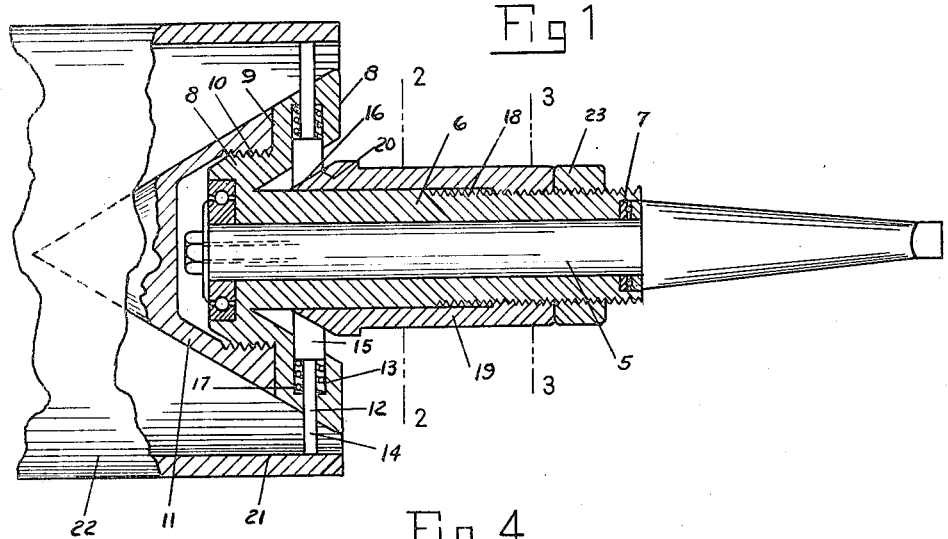
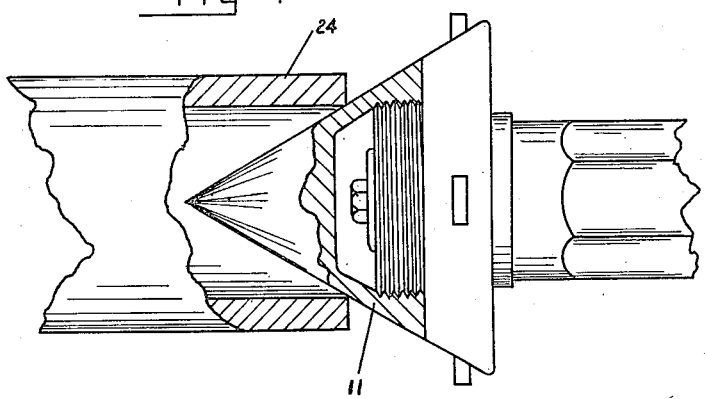
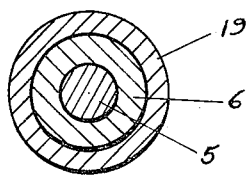
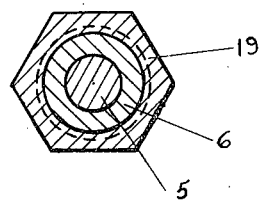
*INVENTOR.*
WILLARD A. LANDRETH
BY
ATTORNEYS Patented Mar. 28, 1950

2,501,684

UNITED STATES PATENT OFFICE 2,501,684

CENTERING ATTACHMENT FOR THE TAILSTOCK OF LATHES

Willard A. Landreth, Chicago, Ill.

Application May 3, 1946, Serial No. 666,956

2 Claims. (Cl. 82—44)

The present invention relates to new and useful improvements in centering devices for lathes, or other types of machines, in which the work is supported between centers and is rotated by driving means during which rotation a metal working operation is performed upon the piece of work.

The invention is designed primarily for use upon work having an internal bore and the invention has for its primary object to provide expansible means mounted on the spindle of the tail stock for gripping engagement in the bore of the work, and to provide self-centering means for the work on the tail stock.

A further object of the invention is to provide a device of this character of simple and practical construction, which is efficient and reliable in use, relatively inexpensive to manufacture, easy to assemble in position on the tail stock of the lathe, and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary longitudinal sectional view of the centering attachment mounted on the spindle for a lathe tail stock.

Figures 2 and 3 are transverse sectional views taken on lines 2—2 and 3—3, respectively, of Figure 1.

Figure 4 is a fragmentary longitudinal sectional view showing the conical centering head for use upon work of relatively small diameter.

Referring now to the drawings in detail, and first with respect to the form of the invention illustrated in Figures 1 to 3, inclusive, the numeral 5 designates a spindle for the tail stock of lathes, the spindle being of conventional construction and adapted for rotatably supporting a sleeve 6 by means of bearing assemblies 7 positioned at the ends of the sleeve.

The outer end of the sleeve is formed with a substantially frusto-conical flange 8 which tapers toward the front end of the sleeve and formed with a shoulder 9 to provide a threaded portion 10 on which a conical head 11 is threadedly engaged.

The rear portion of the flange 8 is formed with a plurality of radially extending openings 12 having square chambers 13 at the inner ends thereof. Pins 14 forming gripping jaws are slidably received in the openings 12 and project outwardly at the sides of the flange 8. The inner ends of the pins 14 are formed with square-shaped heads 15 which are beveled at their inner ends, as shown at 16, the pins 14 being retracted by means of coil springs 17 positioned in the chambers 13 behind the heads 15.

The inner end of the sleeve 6 is externally threaded as shown at 18, for threadedly receiving a tubular adjusting nut 19 formed with a tapering front end as shown at 20 for riding against the bevel edges 16 of the heads 15 for the gripping jaws 14, whereby to slide the jaws radially outwardly of the flange 8 into gripping engagement with the internal bore 21 of tubular work 22 to be centered in the lathe.

The adjusting nut 19 is secured in a locked position on the sleeve 6 and against retracting movement of the pins or jaws 14 by means of a jamb nut 23 threaded on the sleeve.

When using the attachment on tubular work of relatively small diameter, as indicated at 24 in Figure 4 of the drawings, the conical head 11 is inserted in one end of the work to engage the internal bore thereof to center the work on the tail stock of the lathe.

From the foregoing it will be apparent that the pins or gripping jaws 14 are normally retracted by the springs 17 when the adjusting nut 19 is moved rearwardly onto sleeve 6 and upon positioning the head 11 in one end of the work and moving the adjusting nut 19 forwardly, the pins or jaws 14 will be projected uniformly in an expanding action to grip the internal bore 21 of the work, and thus center the work on the lathe.

It is believed that the details of construction, manner of use and advantages of the device will be readily understood from the foregoing without further detailed explanation.

It is to be understood, however, that even though I have herein shown and described a preferred embodiment of my invention, the same is susceptible of certain changes fully comprehended by the spirit of the invention as herein described, and the scope of the appended claims.

Having thus described my invention, what I claim is:

1. In a centering attachment for lathe tail stocks including a spindle, a sleeve provided with a tapering flange carried by one end thereof and rotatably mounted on said spindle, there being a plurality of radially-extending openings in said flange, a pin provided with a head positioned in each of said openings, each of said heads having a tapered inner end, resilient means circumposed on each of said pins for normally biasing the latter inwardly, a tubular adjusting nut having a tapered front end arranged on said sleeve so that the tapered end is contiguous to said flange and mounted for longitudinal movement on the sleeve whereby movement of said nut in one direction causes its tapered end to engage the tapered ends of the heads of said pins and cause consequent outward movement of said pins, and means on said sleeve for locking the adjusting nut in its adjusting position.

2. In a centering attachment for lathe tail stocks including a spindle, a sleeve provided with a tapering flange carried by one end thereof and rotatably mounted on said spindle, said sleeve being threaded exteriorly for a portion of its length extending inwardly from the other end thereof, there being a plurality of radially-extending openings in said flange, a pin provided with a head positioned in each of said openings, each of said heads having a tapered inner end, resilient means circumposed on each of said pins for normally biasing the latter inwardly, an internally-threaded tubular adjusting nut having a tapered front end arranged on said sleeve so that the tapered end is contiguous to said flange and in threaded engagement with said sleeve, whereby movement of said nut in one direction causes its tapered end to engage the tapered ends of the heads of said pins and cause consequent outward movement of said pins.

WILLARD A. LANDRETH.

REFERENCES CITED

The following references are of record in the file of this patent:

UNITED STATES PATENTS

| Number | Name | Date |
| --- | --- | --- |
| 749,202 | Klay | Jan. 12, 1904 |
| 763,568 | Quandt | June 28, 1904 |
| 960,678 | McIntyre | June 7, 1910 |
| 1,198,030 | Helgerud | Sept. 12, 1916 |
| 1,527,866 | Hall | Feb. 24, 1925 |